(12) United States Patent
Mishra et al.

(10) Patent No.: US 9,196,154 B2
(45) Date of Patent: Nov. 24, 2015

(54) METHOD AND ELECTRONIC DEVICE FOR CONTROLLING DISPLAY DEVICE USING WATERMARK

(71) Applicant: Samsung Electronics Co., Ltd., Suwon-si (KR)

(72) Inventors: Pankaj Mishra, Noida Uttar Pradesh (IN); Nishant Bugalia, Rajasthan (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 14/077,679

(22) Filed: Nov. 12, 2013

(65) Prior Publication Data

US 2014/0133694 A1 May 15, 2014

(30) Foreign Application Priority Data

Nov. 12, 2012 (IN) ............................ 4720/CHE/2012
Jul. 16, 2013 (KR) ........................ 10-2013-0083574

(51) Int. Cl.
| | | |
|---|---|---|
| G06K 9/00 | (2006.01) |
| G08C 19/28 | (2006.01) |
| G08C 17/02 | (2006.01) |
| G08C 23/04 | (2006.01) |
| G06F 3/0482 | (2013.01) |
| H04N 1/32 | (2006.01) |
| H04N 1/00 | (2006.01) |

(52) U.S. Cl.
CPC .............. *G08C 19/28* (2013.01); *G06F 3/0482* (2013.01); *G08C 17/02* (2013.01); *G08C 23/04* (2013.01); *H04N 1/00129* (2013.01); *H04N 1/00336* (2013.01); *H04N 1/00416* (2013.01); *H04N 1/00503* (2013.01); *H04N 1/00506* (2013.01); *H04N 1/32309* (2013.01); *G06K 2209/25* (2013.01); *G08C 2201/21* (2013.01); *G08C 2201/71* (2013.01); *G08C 2201/93* (2013.01); *H04N 2201/0053* (2013.01); *H04N 2201/0068* (2013.01); *H04N 2201/0084* (2013.01); *H04N 2201/0089* (2013.01); *H04N 2201/3273* (2013.01)

(58) Field of Classification Search
USPC .......................................................... 382/100
See application file for complete search history.

(56) References Cited

U.S. PATENT DOCUMENTS

| | | | |
|---|---|---|---|
| 6,216,228 B1 * | 4/2001 | Chapman et al. .............. 713/176 |
| 6,737,957 B1 | 5/2004 | Petrovic et al. | |
| 7,295,709 B2 | 11/2007 | Cootes et al. | |
| 7,324,168 B2 | 1/2008 | Griesau et al. | |
| 2002/0102966 A1 | 8/2002 | Lev et al. | |
| 2005/0036613 A1 * | 2/2005 | Zhou et al. ...................... 380/203 |
| 2007/0013775 A1 * | 1/2007 | Shin .............................. 348/114 |
| 2007/0080845 A1 | 4/2007 | Amand | |
| 2012/0242793 A1 * | 9/2012 | Im et al. .......................... 348/46 |
| 2012/0274852 A1 * | 11/2012 | Jung .............................. 348/564 |
| 2013/0005250 A1 * | 1/2013 | Kim et al. ..................... 455/41.1 |

* cited by examiner

*Primary Examiner* — Amara Abdi
(74) *Attorney, Agent, or Firm* — Sughrue Mion, PLLC (57) ABSTRACT

A method for an electronic device configured to control a display device by using a watermark is provided. The method includes receiving a captured image of the display device from a remote control device, extracting a watermark from the captured image, acquiring a menu for the display device based on the watermark, and transmitting the menu to the remote control device for controlling the display device.

20 Claims, 9 Drawing Sheets

METHOD AND ELECTRONIC DEVICE FOR CONTROLLING DISPLAY DEVICE USING WATERMARK

RELATED APPLICATIONS

This application claims priority from Indian Patent Application No. 4720/CHE/2012, filed on Nov. 12, 2012 in the Indian Patent Office, and Korean Patent Application No. 10-2013-0083574, filed on Jul. 16, 2013 in the Korean Intellectual Property Office, the disclosures of which are incorporated herein in their entireties by reference.

BACKGROUND

1. Field

Apparatuses and methods consistent with exemplary embodiments relate to a display device field, and more particularly, to a method and electronic device for controlling a display device by using a watermark.

2. Description of the Related Art

A general-purpose remote control device for remotely controlling various devices, such as a television (TV), a cable box, and an air conditioner, has gained popularity. The general-purpose remote control device typically has a plurality of operation modes for controlling various devices. Each operation mode allows a user to remotely control one of the various devices. However, such a general-purpose remote control device may require the user change the operation mode from one device to another device. Furthermore, the operation of the general-purpose remote control device may be confusing, especially when the user turns on a plurality of devices and tries to control one of the devices. Furthermore, a lot of buttons may typically need to be pressed to turn on or off a plurality of devices.

Current general-purpose remote control devices tend to include a single mode button instead of separate buttons for respective devices. When the mode button is pressed, the operation mode of the general-purpose remote control device is changed from one operation mode to the next operation mode. Thus, in order to change one operation mode to another operation mode, it is frequently necessary to press the mode button several times. Furthermore, the user needs to remember the location of a device within a device cycle and may also manually set the menu of the device. Furthermore, the number of buttons is limited by the design of the general-purpose control device.

Therefore, there is a need for a method and system for efficiently controlling a display device which may be done by using a watermark.

SUMMARY

One or more exemplary embodiments provide a method and system for efficiently controlling a display device by using a watermark, which may extract the watermark included in a captured image of the display device, obtain a menu for controlling the display device based on the extracted watermark, and provide the menu to a remote control device.

According to an aspect of an exemplary embodiment, there is provided a method for an electronic device configured to control a display device by using a watermark, the method including receiving, by the electronic device, a captured image of the display device from a remote control device, extracting, by the electronic device, a watermark from the captured image, acquiring, by the electronic device, a menu for the display device based on the watermark, and providing the menu from the electronic device to the remote control device.

The electronic device may be a server.

The acquiring the menu may include determining a function of the display device based on the watermark, retrieving function information related to the function, and selecting the menu based on at least the function information.

The menu may include a control command for controlling the remote control device, and wherein the menu may be used by the remote control device to control the display device.

The captured image may be generated by the remote control device photographing the display device.

The display device may be photographed by the remote control device when the remote control device is positioned toward the display device, and wherein the captured image may be generated by the remote control device based on the photographed display device.

The captured image may be generated by the remote control device in response to a predetermined gesture.

The acquiring the menu may further include determining whether the watermark is valid, acquiring a device identifier (ID) of the display device matched with the watermark in response to the watermark being valid, and acquiring a menu based on the device ID, wherein the menu is configured to control the display device.

The method may further include determining that the display device is usable, wherein the display device is connected through a network, generating the watermark for the display device, acquiring function information related to a function of the display device, and matching and registering a device identifier (ID) of the display device with the watermark and the function information.

The menu may be displayed on a screen of the remote control device and is edited based on an input on the remote control device.

The captured image may be generated by photographing an output displayed on the display device, and wherein the output displayed on the display device may include the watermark rendered by the display device and video content rendered by the display device.

The acquiring of the menu may include receiving the menu from at least one of the display device, another device of a user, and a manufacturer server.

The transmitting of the menu may include transmitting a plurality of menus respectively matched with the plurality of display devices, to the remote control device in response to the plurality of display devices being identified.

The menu transmitted to the remote control device may be displayed on a screen of the remote control device, and wherein the display device may be controlled based on an input on the menu.

According to another aspect of an exemplary embodiment, there is provided an electronic device configured to control a display device by using a watermark, the electronic device including a watermark extraction module configured to extract a watermark included in a captured image of a display device that is received from a remote control device, a menu acquisition module configured to acquire a menu for controlling the display device based on the watermark, wherein acquiring the menu further comprises determining a function of the display device based on the watermark, retrieving function information related to the function, and selecting the function based on at least the function information, and a communication module configured to transmit the menu to the remote control device.

The electronic device may be a server.

The captured image may be generated by the remote control device in response to a predetermined gesture.

The electronic device may further include a watermark identification module configured to determine whether the watermark is valid, wherein the menu is acquired in response to the watermark being valid.

The electronic device may further include a watermark generation module configured to generate the watermark of the display device.

The electronic device may further include a database configured to store matching information after matching a device identifier (ID) of the display device, the watermark, and the function information regarding the function of the display device.

According to another aspect of an exemplary embodiment, there is provided a method of a remote control device configured to control a display device, the method including transmitting a captured image of the display device from the remote control device to an electronic device, receiving, by the remote control device, a menu for controlling the display device from the electronic device, and controlling, by the remote control device, the display device based on an input from the menu, wherein the captured image includes a watermark of the display device, and wherein the menu is acquired by the electronic device based on the watermark included in the captured image.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

In the present specification, the term "connected" includes "electrically connected" as well as "directly connected." Furthermore, the term "include" does not exclude other components which are not mentioned here, but may also include other components.

Figure 1:
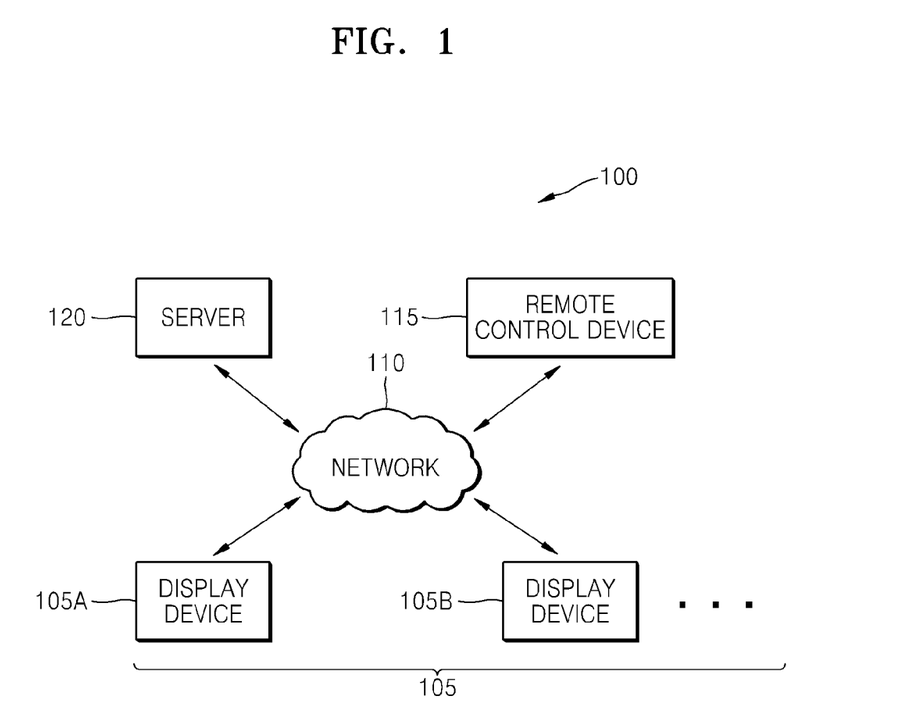
FIG. 1 is a diagram schematically illustrating a system for controlling a display device, according to an exemplary embodiment.

FIG. 1 is a diagram schematically illustrating a system 100 for controlling a display device, according to an exemplary embodiment. The display device control system 100 includes at least a plurality of display devices 105 including a display device 105A and a display device 105B, a network 110, a remote control device 115, and an electronic device 120. At least one of the plurality of display devices 105 is connected to the remote control device 115 and the electronic device 120 through the network 110. Some examples of the display device 105A include, but are not limited to, a digital TV, a mobile device, a notebook computer, a tablet, a personal digital assistant (PDA), a smartphone, and a home theater system. Some examples of the network 110 include, though the examples are not limited thereto, a local area network, a wide area network, and a wireless network.

The display device 105A may be controlled by the remote control device 115 through the electronic device 120. The electronic device 120 receives a captured image of the display device 105A from the remote control device 115. The captured image may be processed by the electronic device 120 to authenticate and identify the display device 105A based on the watermark included in the captured image. The electronic device 120 provides the menu of the display device 105A to the remote control device 115. As such, the display device 105A may be controlled by a user of the remote control device 115. For example, the electronic device 120 may be a server but the exemplary embodiments are not limited.

Further, the menu may be a user interface for controlling the display device 105A. A list of functions of the display device 105A may be displayed on the menu, and as a predetermined list is selected by the user, a control command for controlling a function corresponding to the selected list may be transmitted to the display device 105A. Furthermore, the menu may be generated in a format that may be displayed on the remote control device 115, and may be edited based on the user's input on the remote control device 115.

Figure 2:
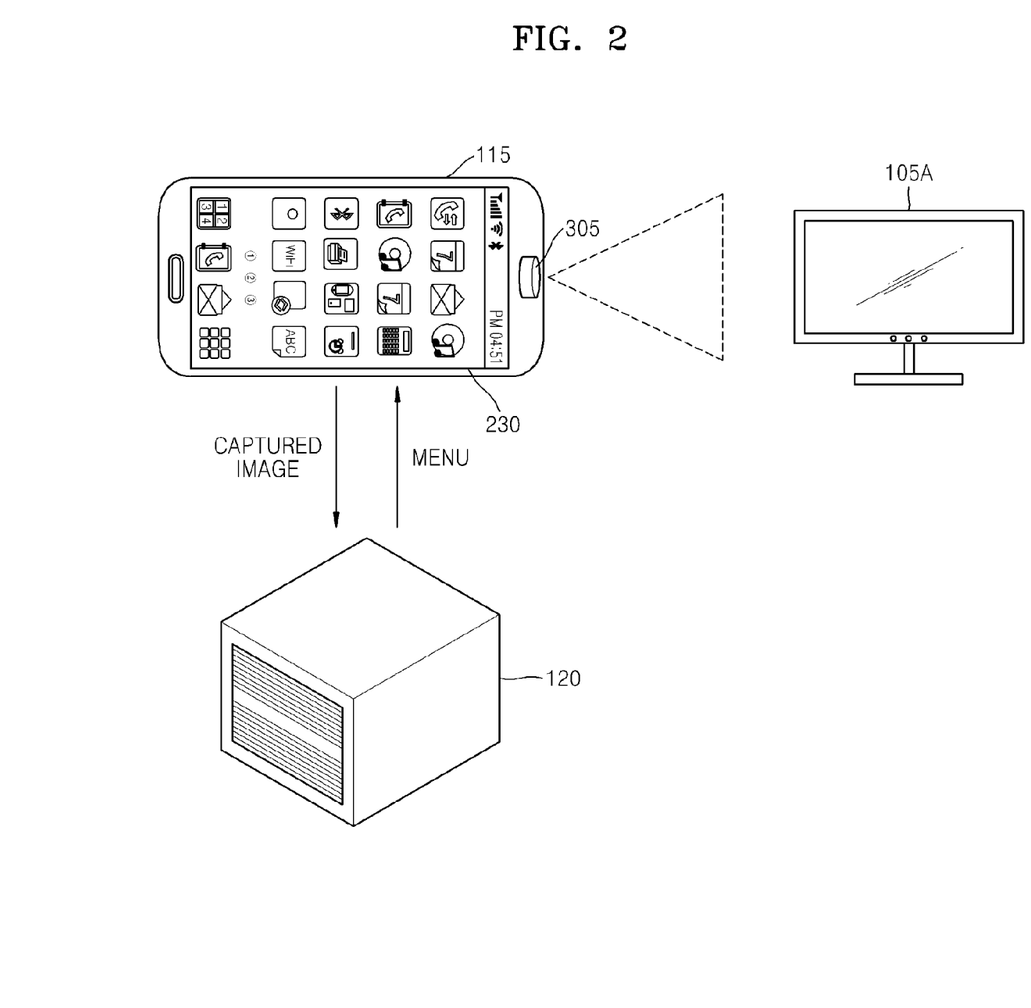
FIG. 2 is a diagram illustrating a remote control device according to an exemplary embodiment.

FIG. 2 is a diagram illustrating the remote control device 115 according to an exemplary embodiment. Referring to FIG. 2, the remote control device 115 may include a camera and a touch screen, and may have a communication function, such as Bluetooth and Wi-Fi. The display device 105A may be photographed by the remote control device 115, and as the display device 105A is photographed, the captured image may be generated by the remote control device 115. The captured image is then transmitted to the electronic device 120. The electronic device 120 extracts the watermark included in the captured image, and the menu is acquired based on the extracted watermark. The menu for controlling the acquired display device 105A may be displayed on a display 230 of the remote control device 115, and the user may select a control command from the menu.

Figure 3:
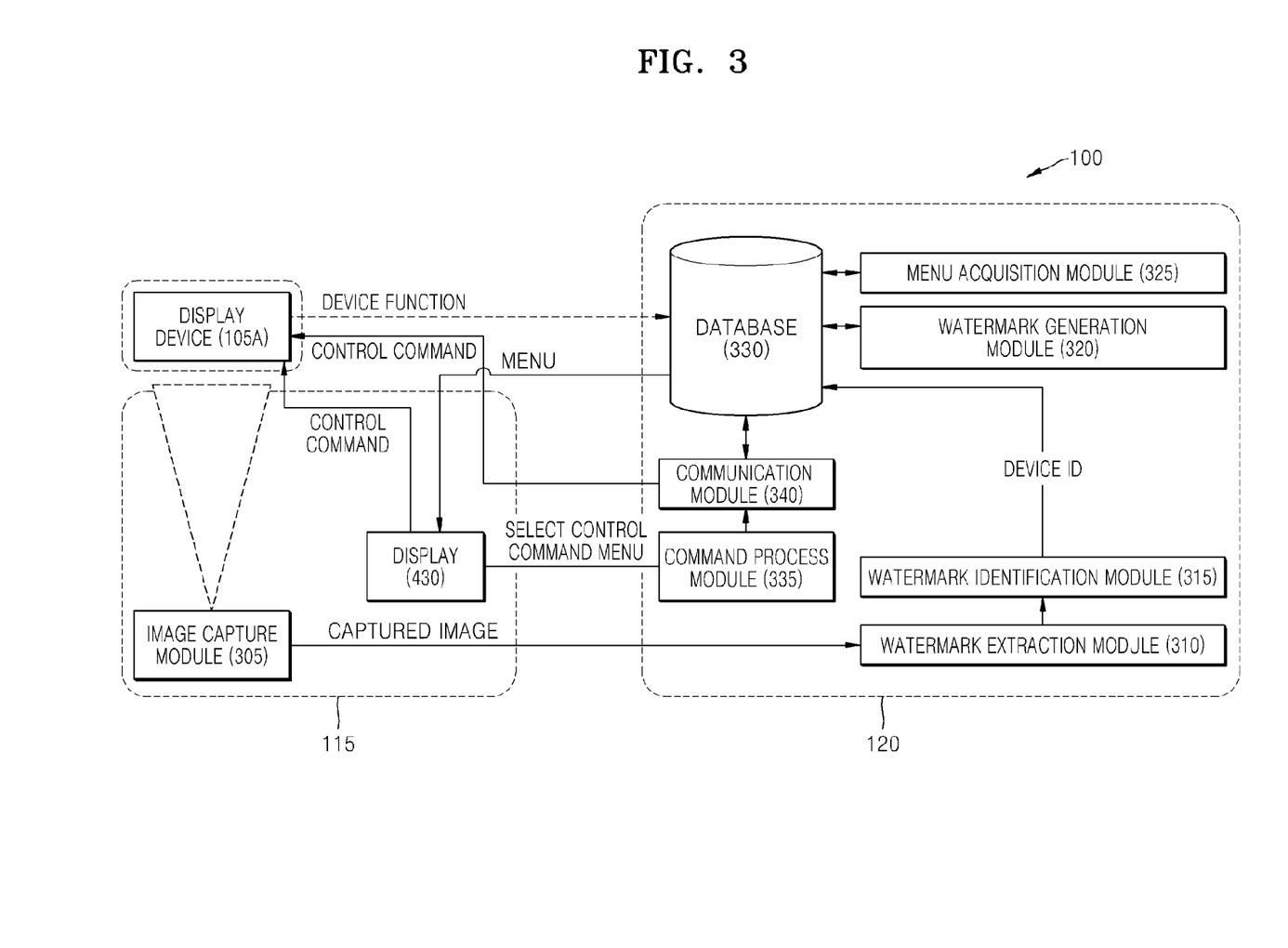
FIG. 3 is a block diagram of a display device control system according to an exemplary embodiment.

FIG. 3 is a block diagram of a display device control system 100 according to an exemplary embodiment. The display device control system 100 includes a display device 105A, a remote control device 115, and an electronic device 120. The remote control device 115 may include an image capture module 305 and a display 430, such as a touch screen display. The electronic device 120 may further include a watermark extraction module 310, a watermark identification module 315, a watermark generation module 320, a menu acquisition module 325, a database 330, a command processing module 335, and a communication module 340.

In some exemplary embodiments, the electronic device 120 may exist within the remote control device 115. Specifically, according to an exemplary embodiment the electronic device 120 and remote control device 115 may be found together such that they are effectively one and the same. Particularly, the electronic device 120 and remote control device 115 may be embodied within, for example, a smart phone, a tablet, or the like. In other exemplary embodiments, the electronic device 120 may be generated using cloud computing.

The display device 105A has a function of rendering a digital watermark (hereinafter, referred to as "watermark") along with video data. The watermark may be an image or data inserted in a predetermined area of a displayed still image or moving image. For example, the watermark may be an image inserted in a symbol image included in a displayed still image or moving image. Furthermore, the watermark may also be a quick response (QR) code displayed on a displayed still image or moving image. However, the present exemplary embodiment is not limited thereto. If a peripheral device, such as a CD/DVD player and an audio player, is connected to the display device 105A, the display device 105A may show a watermark of the peripheral device on the display screen of the display device 105A. The display device 105A further communicates with the electronic device 120 to receive the watermark and a control command through Wi-Fi or Bluetooth. The display device 105A may directly receive the control command from the remote control device 115.

The remote control device 115 uses an image capture module 305 to capture a captured image. The frequency of the captured image may be set to a default value that may be modified by the user. In order to save power, the image capture module 305 may capture the captured image whenever the motion is sensed by a motion sensor of the remote control device 115. Furthermore, the captured image may be generated by the remote control device 115 only when the user's gesture is a predetermined gesture. The captured image is transmitted to the electronic device 120 for additional processing. The electronic device 120 provides the menu to the identified display device 105A and may also provide the menu to the remote control device 115. The menu may be displayed on the display 430 of the remote control device 115. The control command of the menu, which is selected by the user, may be directly transmitted to the display device 105A, or may be transmitted to the electronic device 120 based on the function of the display device 105A and then be transmitted to the display device 105A. The communication may be performed wirelessly through, for example, Wi-Fi or Bluetooth. For example, the display 430, such as a touch screen display, displays a menu received from the electronic device 120, and receives a control command selected by the user.

The watermark extraction module 310 within the electronic device 120 receives a captured image from the image capture module 305 and extracts the existence of the watermark included in the captured image. The watermark identification module 315 identifies the validity of the watermark, and if the watermark is valid, but the display device 105A is not registered, the device identifier (ID) of the display device 105A is generated, and the device ID is matched with the extracted watermark and the matching is stored. If the watermark is not extracted in the captured image, the watermark and the device ID of the display device 105A are generated, and the generated watermark is matched with the device ID and the matching is stored.

The watermark generation module 320 generates a watermark based on the device ID for a newly connected display device 105A. The watermark of the display device 105A is stored within the database 330. The watermark may be displayed on the screen of the display device 105A, and may be or may not be visible to a user. The menu acquisition module 325 acquires the menu for controlling the display device 105A. The menu may be retrieved from the display device 105A or may be edited and acquired based on the user's input on the remote control device 115 based on the function information regarding the function of the display device 105A. The menu is stored within the database 330. The database 330 maintains the list of the display device 105A controlled using the remote control device 115, and stores the watermark and menu related with the display device 105A.

Furthermore, the device ID is generated and allocated for each display device 105A in the electronic device 120. The details of the display device 105A, including the function of the display device 105A, the menu, and the watermark may be searched in the database 330 by providing the device ID. The command processing module 335 receives one or more control commands selected by the user of the remote control device 115. The command processing module 335 identifies the communication mode and the display device 105A to transmit the control command. The communication module 340 transmits a control command to allow communication between the display device 105A and the remote control device 115. The communication module 340 transmits function information regarding the function of the display device 105A from the database 330, and a control command based on the communication mode, such as Bluetooth and Wi-Fi.

FIG. 3 separately illustrates the remote control device 115 and the electronic device 120, but the exemplary embodiment is not limited thereto. The function of the electronic device 120 of FIG. 3 may be performed by the remote control device 115, and in this case, the remote control device 115 may generate a menu for extracting the watermark from the captured image and controlling the display device 105A.

Figure 4:
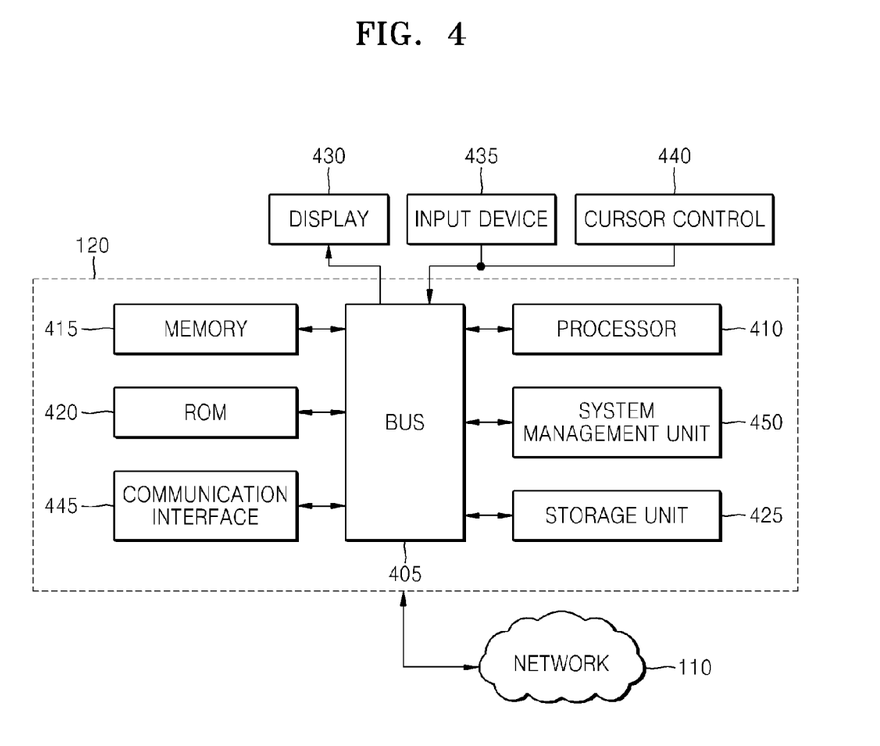
FIG. 4 is a block diagram of an electronic device according to an exemplary embodiment.

FIG. 4 is a block diagram of the electronic device 120 according to an exemplary embodiment.

The electronic device 120 includes a bus 405 or another communication means for information communication, and a processor 410 connected to the bus 405 for processing information. The electronic device 120 may include a memory 415, such as random access memory (RAM) or another dynamic storage device, which is connected to the bus 405, in order to store information and a control command executed by the processor 410. The memory 415 may be used to store a temporary variable or other intermediate information which executes a control command by the processor 410. The electronic device 120 may further include read only memory (ROM) 420 or another static storage device connected to the bus 405 to store static information for the processor and a control command.

The electronic device 120 may be connected to the display 430, such as a cathode ray tube (CRT), through the bus 405 in order to display data. An input device 435, including characters, numbers, and other keys, is connected to the bus 405 for information communication and command selection for the processor 410. Another type of user input device is the cursor control 440, for example a mouse, a trackball, or cursor direction keys for communicating direction information and command selections to the processor 410 and for controlling cursor movement on the display 430.

Various exemplary embodiments are related with the use of the electronic device 120 for implementing technologies described here. In some exemplary embodiments, the technology is performed by the electronic device 120, including the processor 410 that executes a control command included in the memory 415. The control command may be read in the memory 415 from the recording medium that may be read by another device, such as a storage unit 425. The execution of the control command included in the memory 415 allows the processor 410 to perform operations of the process described here.

In some exemplary embodiments, the processor 410 may include one or more processing units for performing one or more functions of the processor 410. The processing unit may be a hardware circuit that substitutes a software control command for performing a special function and may be used in combination with the software control command.

The expression "recording medium readable by a device" is used to indicate an arbitrary recording medium that participates in providing data that allows performance of a certain function by the device. In the exemplary embodiment implemented using the electronic device 120, the recording medium readable by various devices, for example, may be related with providing a control command to the processor 410 for execution. The recording medium readable by a device may be a volatile or non-volatile storage medium. The volatile storage medium may include the memory 415, such as a dynamic memory. The non-volatile storage medium may include the storage unit 425, such as an optical or magnetic disk. All such media must be tangible to enable the instructions on the media to be detected by a physical mechanism that reads the instructions into the device. Some examples of general forms of the recording medium readable by a device include a floppy disk, a flexible disk, a hard disk, a magnetic tape, or another magnetic recording medium, CD-ROM, other optical media, a punch card, a punch table, a physical recording medium having another punch pattern, RAM, PROM, EPROM, FLASH-EPROM, and any other random memory chip or cartridge.

In another exemplary embodiment, the recording medium readable by a device may be transmission media including coaxial cables, copper wire and fiber optics, including wires that include the bus 405. Transmission media may also take the form of acoustic or light waves, such as those generated during radio-wave and infra-red data communications.

An example of the recording medium readable by a device may include another arbitrary recording medium that may be readable or the electronic device 120. However, the present exemplary embodiment is not limited thereto, and, for example, a control command may be executed in a magnetic disk of a remote computer. The remote computer may load the control command to a dynamic memory and may transmit the control command through a phone line using a modem. A modem local for the electronic device 120 may receive data on the phone line, and may use an infrared transmitter to convert data into infrared signals. An infrared ray detector may receive data transmitted in infrared signals, and an appropriate circuit may arrange data on the bus 405. The bus 405 may transmit data to the memory 415, and the processor 410 may search for and execute the control command based thereon. The control command received by the memory 415 may be selectively stored in the storage unit 425 before or after the execution by the processor 410. All such recording medium need to be tangible to enable the control command transmitted by the recording medium to be detected by a physical mechanism that may read the control command into the device.

The electronic device 120 may also include a communication interface 445 connected with the bus 405. The communication interface 445 provides two-way data communication between the electronic device 120 and a display device (e.g., display device 105A) and between the electronic device 120 and a remote control device (e.g., remote control device 115) through the network 110. For example, the communication interface 445 may be a modem for providing data communication connection in response to the type of an integrated services digital network (ISDN) card or a phone line. As another example, the communication interface 445 may be a local area network (LAN) card for providing data communication connection that is compatible with a LAN. Here, the communication interface 445 transmits and receives electrical, electronic, or optical signals that transmit a digital data stream indicating various forms of information.

The processor 410 within the electronic device 120 may be operated to receive a captured image of the display device 105A from the remote control device 115. The captured image is processed by the processor 410 to identify the display device 105A based on the watermark included in the captured image. The processor 410 provides the menu of the display device 105A to the remote control device 115. Likewise, the display device 105A may be controlled by the user of the remote control device 115.

The electronic device 120 may further include a system management unit 450 that manages the display device 105A. Furthermore, the electronic device 120 may play a role of the system management unit 450 that manages the display device 105A.

Figure 5:
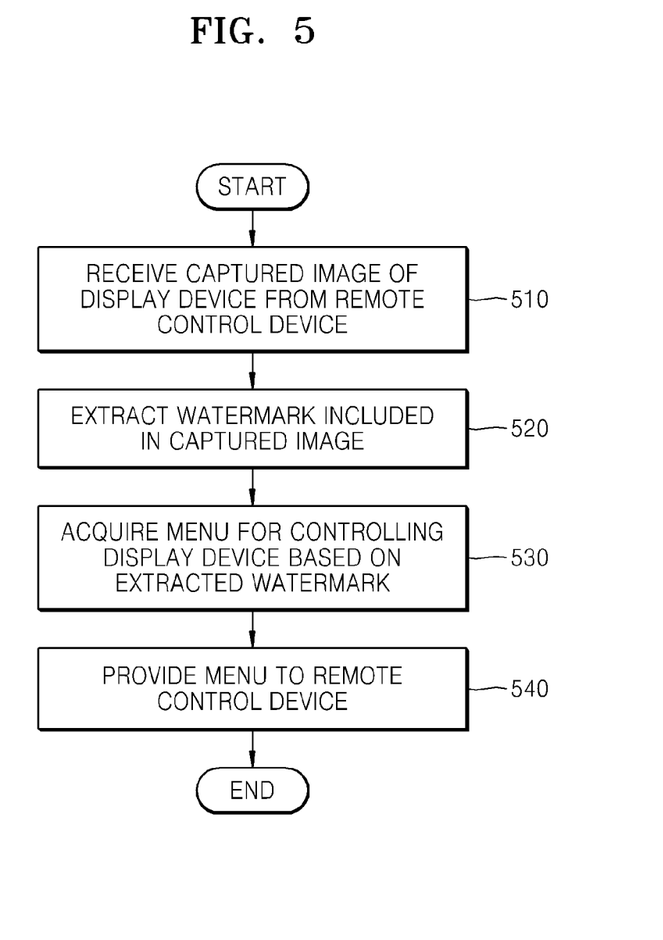
FIG. 5 is a flowchart illustrating a method of controlling a display device by using a watermark, according to an exemplary embodiment.

FIG. 5 is a flowchart illustrating a method of controlling a display device by using a watermark, according to an exemplary embodiment.

In operation 510, the electronic device 120 receives the captured image of the display device 105A from the remote control device 115. The captured image may be captured by the image capture module 305 of the remote control device 115. The captured image may be generated only when the predetermined motion is detected by the motion sensor of the remote control device 115. As the remote control device 115 is positioned toward the display device 105A, the display device 105A is photographed by the remote control device 115, and as the display device 105A is photographed, the captured image may be generated by the remote control device 115.

In operation 520, the electronic device 120 extracts the watermark included in the captured image. The watermark generation module 320 may generate the watermark based on the device ID of the display device 105A. The watermark extraction module 310 receives the captured image to detect the watermark. The watermark identification module 315 determines the validity of the watermark, and if the watermark is valid, the watermark identifier is generated. In some exemplary embodiments, if a peripheral device other than the display device 105A is connected to the display device 105A, the watermark of the peripheral device may be mixed within the video stream of the display device 105A and may be rendered in the screen of the display device 105A.

In operation 530, the electronic device 120 acquires the menu for controlling the display device 105A based on the extracted watermark. The menu acquisition module 325 may acquire the menu for controlling the display device 105A if the extracted watermark is valid. The function information about the menu and the function of the display device 105A may be additionally acquired by the electronic device 120 by providing the device ID of the display device 105A to the display device 105A or the manufacturer of the electronic device 120. The menu may be generated in advance based on the function information of the display device 105A, and may be generated in a format that may be used in the remote control device 115.

The menu acquisition module 325 may acquire the menu by using the extracted watermark, and the device ID of the display device 105A and the device ID of the remote control device 115 corresponding to the extracted watermark. The menu may be displayed on the remote control device 115 where the operation for control of the display device 105A is performed, so as to control the display device 105A.

In operation 540, the electronic device 120 provides the menu of the display device 105A to the remote control device 115. In some exemplary embodiments, when a plurality of display devices 105 are identified, the electronic device 120 may provide a plurality of menus that are respectively matched with the plurality of display devices 105, to the remote control device 115. Cases where a plurality of display devices 105 are identified may include a case where a plurality of display devices 105 are included in the photographed image, a case where a plurality of captured images are received, and a case where a plurality of watermarks are included in one captured image. In some exemplary embodiments, the menu may be customized by the user in a manner that the menu is edited based on the user's input on the remote control device 115 based on the function information regarding the function of the display device 105A.

If the menu is provided to the remote control device 115 and the menu is displayed on the remote control device 115, the display device 105A may be controlled by the user of the remote control device 115. The user may view the menu on the display 430 and select from a menu to control. In an exemplary embodiment, the display 430 may be a touch screen display. The selection is converted into the control command, and the control command is transmitted to the command processing module 335. The control command may be transmitted to the display device 105A by the communication module 340 in order to enable communication between the display device 105A and the remote control device 115. Furthermore, in an exemplary embodiment, the control command may be directly transmitted from the remote control device 115 to the display device 105A.

Figure 6:
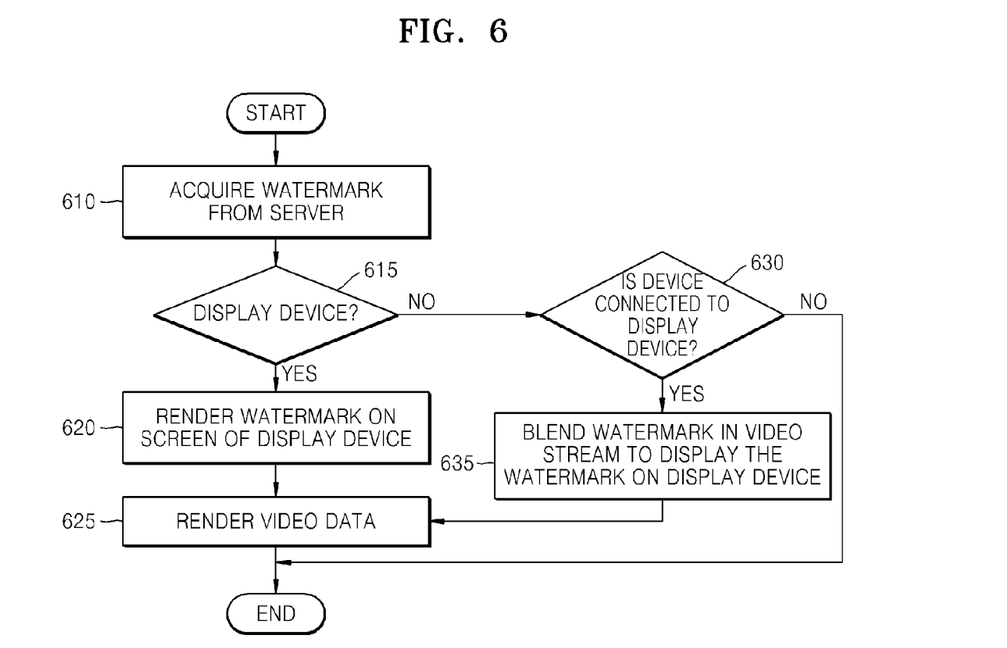
FIG. 6 is a flowchart illustrating a method in which a controlled device displays an image including a watermark, according to an exemplary embodiment.

FIG. 6 is a flowchart illustrating a method in which a controlled device displays an image including a watermark, according to an exemplary embodiment. The controlled device may be the display device 105A. However, the present exemplary embodiment is not limited thereto, and the controlled device may be another device without a display function.

In operation 610, the controlled device acquires the watermark from the electronic device 120. In an exemplary embodiment, the watermark may be stored in the controlled device in advance.

In operation 615, it is determined whether the controlled device is a display device. If the controlled device is a display device, operation 620 is performed; however, if the controlled device is not a display device, operation 630 is performed.

In operation 620, the watermark is rendered in the screen of the display device.

In operation 625, video data is also rendered.

In operation 630, it is determined whether the controlled device which is not a display device has been connected to the display device. If the controlled device has been connected to the display device, operation 635 is performed; otherwise, no operation is perfect and the process is terminated.

In operation 635, the watermark is blended within the video stream on the display device connected to the controlled device. Thereafter, in operation 625, the watermark-blended video data is rendered by the display device. Hence, the controlled device other than the display device may render the watermark through a peripheral display device, and if the watermark is identified, control by the remote control device 115 becomes possible.

Figure 7:
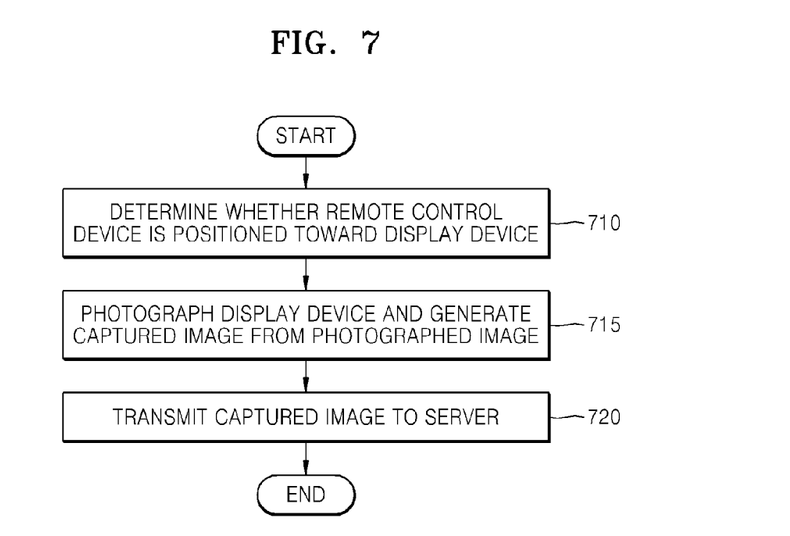
FIG. 7 is a flowchart illustrating generation of a captured image, according to an exemplary embodiment.

FIG. 7 is a flowchart illustrating generation of a captured image, according to an exemplary embodiment.

In operation 710, it is determined whether the remote control device 115 is positioned toward the display device 105A. In an exemplary embodiment, after an arbitrary motion or a preset motion is detected, only when the remote control device 115 is positioned toward the display device 105A, the mode of photographing the display device 105A may be started. In another exemplary embodiment, the mode of photographing the display device 105A may be started by pressing a button.

In operation 715, the display device 105A is photographed, and the captured image is generated from the photographed image. The captured image is captured by the image capture module 305. In an exemplary embodiment, when a plurality of devices are detected, the priority of the display device 105A may be set based on the frequency of use. Here, the remote control device 115 may be set to display the menu of the display device 105A of a higher priority. If the priority is not set or the display devices 105A have similar priorities, a message to select a display device 105A to be controlled among usable display devices 105 may be displayed.

In operation 720, the captured image is transmitted to the electronic device 120.

Figure 8:
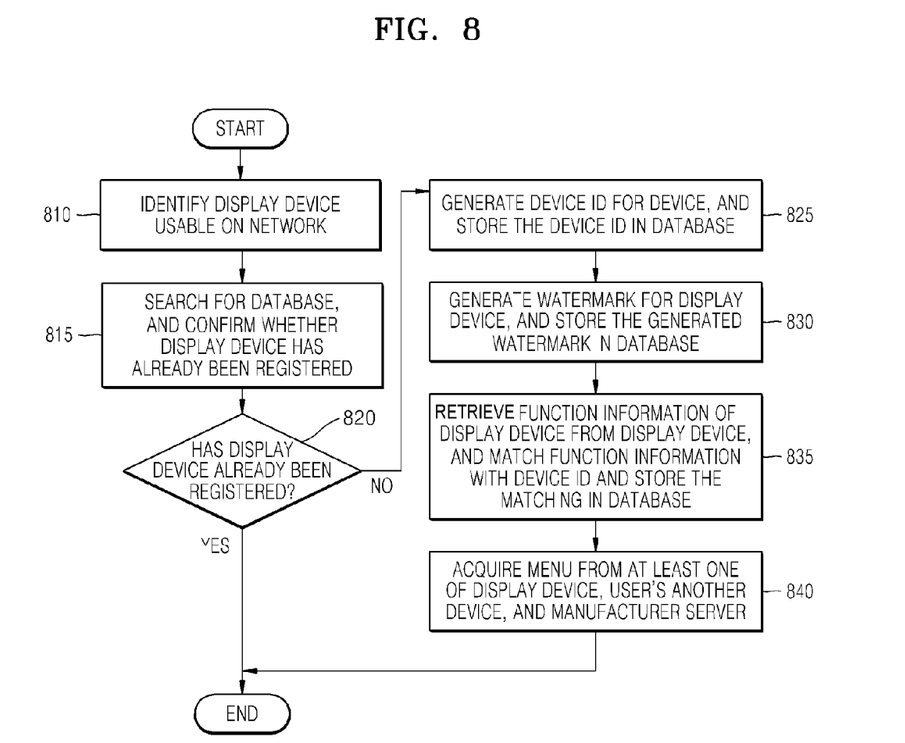
FIG. 8 is a flowchart illustrating registration of a display device, according to an exemplary embodiment.

FIG. 8 is a flowchart illustrating registration of a display device, according to an exemplary embodiment.

In operation 810, the display device 105A that may be usable in the network 110 is identified. Particularly, the display device 105A is identified by the electronic device 120.

In operation 815, the electronic device 120 searches for the database 330, and determines whether the display device 105A has already been registered.

In operation 820, if the display device 105A has already been registered, the method is terminated; however, if the display device 105A has not been registered, operation 825 is performed.

In operation 825, the device ID is generated for the display device 105A and is stored in the database 330.

In operation 830, a watermark is generated for the display device 105A, and the watermark is matched with the device ID and the matching is stored in the database 330.

In operation 835, the function information regarding the function of the display device 105A is retrieved from the display device 105A, and the information is matched with the device ID and the matching is stored in the database 330. The function information of the display device 105A may be received from at least one of the user's another device, the manufacturer server, as well as the display device 105A itself.

Specifically, in operation 840, the menu may be acquired from at least one of the display devices 105, the user's other devices, and the manufacturer server. In an exemplary embodiment, the menu edited by the user may be acquired based on the function information regarding the function of the display device 105A.

Figure 9:
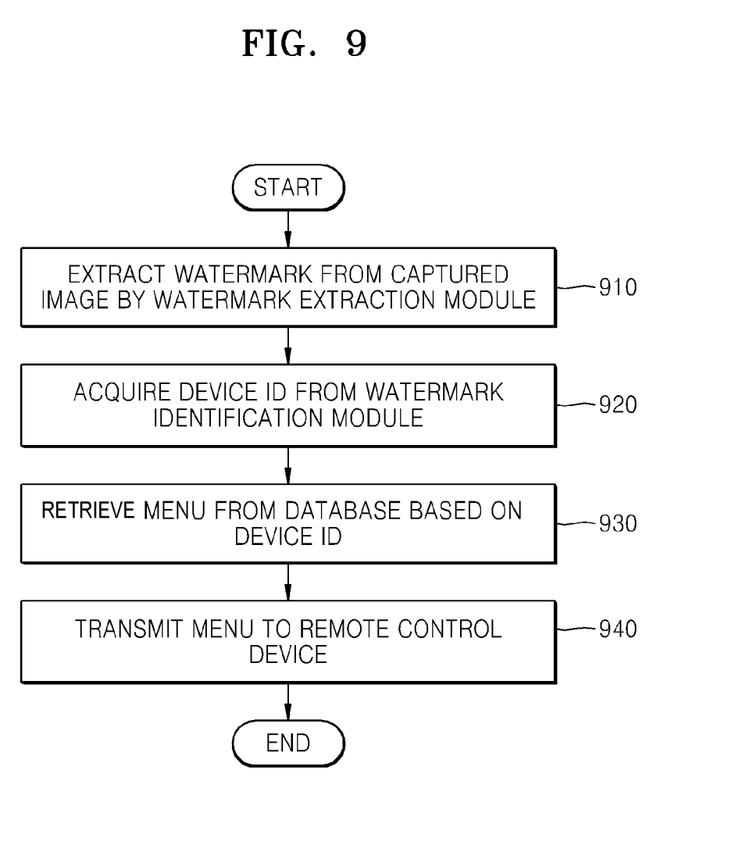
FIG. 9 is a flowchart illustrating a method of loading of a menu of the display device, according to an exemplary embodiment.

FIG. 9 is a flowchart illustrating a method of loading of a menu of the display device 105A, according to an exemplary embodiment.

In operation 910, the watermark extraction module 310 extracts a watermark from a captured image. In an exemplary embodiment, when a plurality of watermarks are extracted, a plurality of menus matched with a plurality of controlled devices may be provided to the remote control device 115.

In operation 920, the device ID is acquired from the watermark identification module 315. The watermark identification module 315 identifies the validity of the watermark, and if the watermark is valid and the display device 105A has not been registered, the device ID of the display device 105A is generated, and the extracted watermark is matched with the device ID and the matching is stored.

In operation 930, the menu stored in the database 330 is retrieved based on the device ID. In an exemplary embodiment, the menu may be directly retrieved from the manufacturer server based on the device ID.

In operation 940, the menu is transmitted to the remote control device 115. The menu may be displayed on the screen of the remote control device 115, and the display device 105A may be controlled by the user's selection on the menu.

Figure 10:
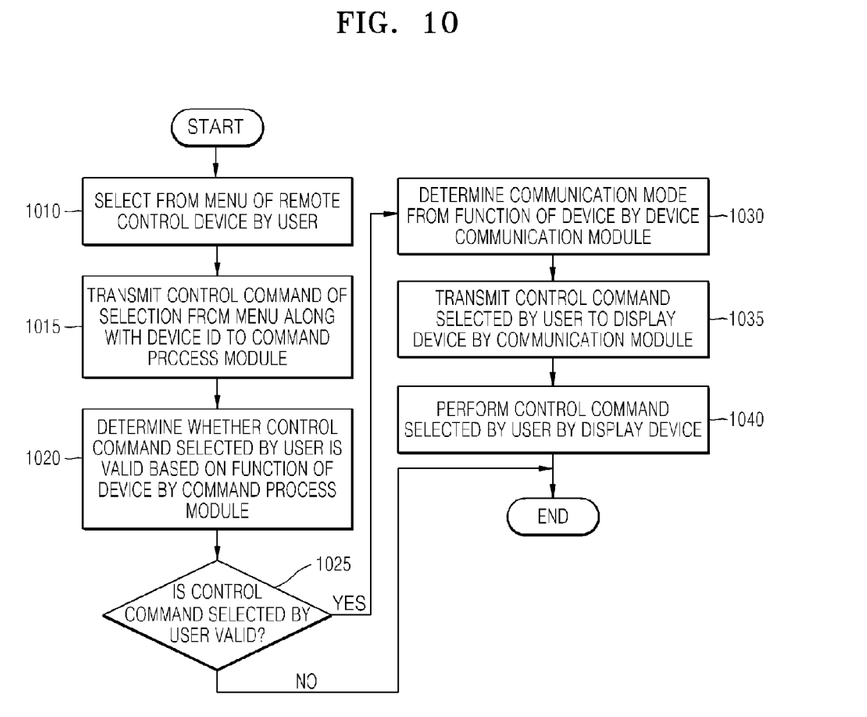
FIG. 10 is a flowchart illustrating an operation by a user, according to an exemplary embodiment.

FIG. 10 is a flowchart illustrating an operation by a user, according to an exemplary embodiment.

In operation 1010, the user selects a control command from the menu of the remote control device 115.

In operation 1015, the selected control command of the menu is transmitted to the command process module 335 along with the device ID of the display device 105A.

In operation 1020, the command process module 335 determines whether the control command of the menu that is selected by the user is valid, based on the function of the display device 105A. In operation 1025, if the selected control command is valid, operation 1030 is performed; otherwise, operation is terminated.

In operation 1030, the communication module 340 determines the communication mode from the function of the display device 105A. In an exemplary embodiment, the communication mode may be infrared rays, Bluetooth, or Wi-Fi depending on the display device 105A.

In operation 1035, the communication module transmits the control command to the display device 105A.

In operation 1040, the display device 105A performs the control command selected by the user.

In an exemplary embodiment, the remote control device 115 may transmit the control command of the menu, which is selected by the user, directly to the display device 105A without passing through the electronic device 120.

Furthermore, the exemplary embodiments specified enable control of a display device that uses a watermark. One remote control device 115 may be used to control several controlled devices, including the display device 105A and peripheral devices, by only indicating several devices. One or more of the exemplary embodiments may enable the user to customize a menu. One or more of the exemplary embodiments may also enables control of an existing display device by using wireless technologies, such as infrared rays, Bluetooth, and Wi-Fi.

In the description above, advantages are described with reference to specific exemplary embodiments. However, it is obvious to those skilled in the art that various modifications and changes may be possible within the scope of the inventive concept. Hence, the specification and drawings are considered as an illustrative example rather than limited meanings. All such modifications are included in the scope of the inventive concept.

One or more exemplary embodiments may be implemented in the form of recording media including commands executable by a computer, such as a computer module executed by a computer. The computer-readable recording medium may be an arbitrary recording medium accessible by a computer, and includes a volatile and non-volatile recording medium, a separable and a non-separable recording medium. Furthermore, the computer-readable recording medium may include a computer storage medium and a communication medium. The computer storage medium includes a volatile and non-volatile recording medium and a separable and non-separable recording medium which are implemented by an arbitrary method or technology for storing information, such as a computer-readable command, a data structure, a program module, or other data. The communication medium typically includes a computer-readable command, a data structure, a program module, other transmission mechanisms, or an arbitrary information transmission medium.

It should be understood that the exemplary embodiments described therein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method for an electronic device configured to control a display device by using a watermark, the method comprising:
   receiving, by the electronic device, a captured image of at least one display device from a remote control device;
   extracting, by the electronic device, a watermark from the captured image;
   acquiring, by the electronic device, a menu for controlling the display device based on the watermark; and
   providing the menu from the electronic device to the remote control device,
   wherein the extracting comprises:
      extracting a plurality of watermarks, including the watermark, from the captured image; and
      identifying the at least one device, including the display device, corresponding to the plurality of watermarks respectively,
   wherein the providing the menu comprises providing a plurality of menus, including the menu, matched with the at least one device respectively to the remote control device, and
   wherein the plurality of menus are displayed on a screen of the remote control device.

2. The method of claim 1, wherein the electronic device is a server.

3. The method of claim 1, wherein the acquiring the menu comprises:
   determining a function of the display device based on the watermark;
   retrieving function information related to the function; and
   selecting the menu based on at least the function information.

4. The method of claim 1, wherein the menu includes a control command for controlling the remote control device, and
   wherein the menu is used by the remote control device to control the display device.

5. The method of claim 1, wherein the captured image is generated by the remote control device photographing the display device.

6. The method of claim 5, wherein the display device is photographed by the remote control device when the remote control device is positioned toward the display device, and
   wherein the captured image is generated by the remote control device based on the photographed display device.

7. The method of claim 5, wherein the captured image is generated by the remote control device in response to a predetermined gesture.

8. The method of claim 1, wherein the acquiring the menu further comprises:

determining whether the watermark is valid;

acquiring a device identifier (ID) of the display device matched with the watermark in response to the watermark being valid; and acquiring a menu based on the device ID, wherein the menu is configured to control the display device.

9. The method of claim 1, further comprising:

determining that the display device is usable within a network;

generating the watermark for the display device;

acquiring function information related to a function of the display device; and matching and registering a device identifier (ID) of the display device with the watermark and the function information.

10. The method of claim 1, wherein the menu is displayed on a screen of the remote control device and is edited based on an input on the remote control device.

11. The method of claim 1, wherein the captured image is generated by photographing an image displayed on the display device, and wherein the image displayed on the display device includes the watermark rendered by the display device and video content rendered by the display device.

12. The method of claim 1, wherein the acquiring of the menu comprises:

receiving the menu from at least one of the display device, another device of a user, and a manufacturer server.

13. The method of claim 1, further comprising:

receiving a user input selecting one of the plurality of menus; and sending at least one controlling command to a display device corresponding to a menu selected by the user input.

14. An electronic device configured to control a display device by using a watermark, the electronic device comprising:

a processor configured to extract a plurality of watermarks from a captured image that is received from a remote control device, identify at least one display device corresponding to the plurality of watermarks respectively, acquire a plurality of menus for respectively controlling the at least one display device based on the plurality of watermarks, and a communication interface configured to transmit the plurality of menus to the remote control device.

15. The electronic device of claim 14, wherein the electronic device is a server.

16. The electronic device of claim 14, wherein the captured image is generated by the remote control device in response to a predetermined gesture.

17. The electronic device of claim 14, wherein the processor is further configured to determine whether the plurality of watermarks are valid, and wherein the plurality of menus are acquired in response to the plurality of watermarks being valid.

18. The electronic device of claim 14, wherein the processor is further configured to generate the plurality of watermarks of the at least one display device.

19. The electronic device of claim 14, further comprising:

a database configured to store matching information after matching a device identifier (ID) of the at least one display device, the plurality of watermarks, and function information regarding a function of the at least one display device.

20. A method for a remote control device configured to control a display device, the method comprising:

transmitting a captured image of at least one display device from the remote control device to an electronic device;

receiving, by the remote control device, a plurality of menus for controlling the at least one display device, respectively, from the electronic device; and controlling, by the remote control device, the display device based on a user input selecting a menu among the plurality of menus, wherein the captured image includes a plurality of watermarks of the at least one display device, and wherein the plurality of watermarks are used in acquiring the plurality of menus for the electronic device to control the at least one display device respectively.

* * * * *